US006641260B1

(12) United States Patent
Avital (10) Patent No.: US 6,641,260 B1
(45) Date of Patent: Nov. 4, 2003

(54) FLAT PACK OPTICAL DEVICE KIT

(75) Inventor: Ami Avital, Tel Aviv (IL)

(73) Assignee: SEE Card Corporation, Randallstown, MD (US)

( * ) Notice: Subject to any disclaimer, the term of this patent is extended or adjusted under 35 U.S.C. 154(b) by 0 days.

(21) Appl. No.: 10/213,741

(22) Filed: Aug. 6, 2002

(51) Int. Cl.[7] .............................................. G02C 1/00
(52) U.S. Cl. ...................... 351/41; 351/115; 351/119; 351/128
(58) Field of Search .................................. 351/115, 116, 351/111, 41, 153, 51, 59, 63, 121, 52, 128, 124, 119

(56) References Cited

U.S. PATENT DOCUMENTS

| | | |
|---|---|---|
| 3,409,347 A | 11/1968 | Vogel |
| 4,776,686 A | * 10/1988 | Stanley et al. ............... 351/115 |
| 5,225,857 A | 7/1993 | Sakamoto |
| 5,448,317 A | 9/1995 | Huang |
| 5,896,185 A | 4/1999 | Huang |
| 5,929,967 A | 7/1999 | Conner |
| 6,017,119 A | 1/2000 | Huang |
| 6,158,860 A | 12/2000 | Huang |
| 6,176,430 B1 | 1/2001 | Finkelstein et al. |
| 6,379,003 B1 | 4/2002 | Seong |
| 6,390,372 B1 | 5/2002 | Waters |

\* cited by examiner

*Primary Examiner*—Hung Xuan Dang
(74) *Attorney, Agent, or Firm*—Armstrong Teasdale LLP (57) ABSTRACT

The present invention aims to provide an emergency, flat pack, glasses kit, which is easily and quickly assemblable into glasses. The kit is compact and typically has the size of a credit card, and may thus be carried in a pocket, wallet or purse. Various types of lenses having a variety of purposes may be fitted or formed in the kit, including prescription lenses to suit the user for general use or for reading, sun-protection or safety lenses. There is thus provided, in accordance with a preferred embodiment of the present invention, a flat pack optical device kit, which includes: one or more lens frames, each having an lens disposed therein and each having one or more frame attachment means formed on the frame; one or more support arms, each having, formed at a first extremity thereof, an arm attachment means for attaching the one or more support arms to the one or more lens frames and each having an ear holder element formed at a second extremity thereof; and apparatus for supporting the one or more lens frames, and the one or more support arms in a planar arrangement, wherein the one or more lens frames and the one or more support arms are adapted for selectable disassembly from the planar arrangement, and for cooperative assembly so as to form the optical device.

12 Claims, 6 Drawing Sheets

FLAT PACK OPTICAL DEVICE KIT

FIELD OF THE INVENTION

The present invention relates, generally to glasses and, more specifically, to a flat pack glasses kit.

GLOSSARY

Proximal: situated close to the user.

Distal: situated distant or away from the user (relative to Proximal).

BACKGROUND OF THE INVENTION

It is known in the art to provide glasses that are easily carried for emergency use. A multiplicity of compact, foldable and collapsible glasses are disclosed, for example, in U.S. Pat. Nos. 5,225,857, 5,896,185, 6,017,119, 6,158,860 and 6,379,003.

Referring to U.S. Pat. No. 5,448,317 to Huang on Sep. 5, 1995, entitled "Combination of foldable glasses and rigid compact container," there are disclosed collapsible glasses and a small rectangular carrying case. Referring to U.S. Pat. No. 5,929,967 to Conner on Jul. 27, 1999, entitled "Combination glasses and glass case," there is disclosed narrow, compact glasses having collapsible ear-pieces, contained in a tubular case, similar to a pen with a pocket clip.

Referring to U.S. Pat. No. 3,409,347 to R. Vogel on Nov. 5, 1968, there is disclosed a pocket magnifier including a pocket pouch adapted to be carried in the pocket, purse or wallet of the user. The lens is formed of a transparent plastic sheet material having a substantial degree of stiffness and having Fresnel lens contours molded into its upper surface.

Referring now to U.S. Pat. No. 6,176,430 to Finkelstein et al. on Jan. 23, 2001, entitled "Method for making a wallet card with an integral magnifying lens," there is disclosed a wallet card adapted for use in reading, including a transparent, substantially non-foldable semi-rigid base. The semi-rigid base includes a Fresnel magnifying lens.

Referring also to U.S. Pat. No. 6,390,372 to Waters on May 21, 2002, entitled "Cards with reading lenses," there is disclosed a reading card including one or more Fresnel reading lenses smaller in size than the card. The card is the size of a typical credit card such that it can fit into a sleeve or holder used for such cards in wallets, and the like. The lenses, which are essentially for reading, are fitted into the card so that there is additional space for placement of, for example, numbers, name and a magnetic strip as in credit, debit, and phone cards.

The reading cards and pocket magnifiers disclosed by Waters, Finkelstein and Vogel hereinabove, are generally functional as hand held devices, essentially for reading and not for use as glasses to be worn by the user. While the foldable glasses disclosed by Huang are very compact and portable, inevitably the lenses will be narrow and appear best suited for reading.

There is a need in the art for lightweight, robust, very flat and compact emergency glasses, which can be used as sunglasses or in accordance with the prescription of the user, to replace damaged or lost glasses, rapidly and conveniently, especially under circumstances in which replacement is problematic.

SUMMARY OF THE INVENTION

The present invention aims to provide an emergency, flat pack, glasses kit, which is easily and quickly assemblable into glasses. The kit is compact and typically has the size of a credit card, and may thus be carried in a pocket, wallet or purse. Various types of lenses having a variety of purposes may be fitted or formed in the kit, including prescription lenses to suit the user for general use or for reading, sun-protection or safety lenses.

There is thus provided, in accordance with a preferred embodiment of the present invention, a flat pack optical device kit, which includes: one or more lens frames, each having an optical lens disposed therein and each having one or more frame attachment means formed on the frame; one or more support arms, each having, formed at a first extremity thereof, an arm attachment means for attaching the one or more support arms to the one or more lens frames and each having an ear holder element formed at a second extremity thereof; and apparatus for supporting the one or more lens frames, and the one or more support arms in a planar arrangement, wherein the one or more lens frames and the one or more support arms are adapted for selectable disassembly from the planar arrangement, and for cooperative assembly so as to form the optical device.

According to a first embodiment of the present invention, the flat pack optical device kit also includes a nosepiece bridge having one or more bridge attachment means for joining the one or more lens frames thereto.

According to a second embodiment of the present invention, the one or more support arms include: one or more hinge members, each having a first and second extremity and a hinge element formed in a predetermined position therebetween, the first and second extremities having, respectively, a first and second hinge attachment means formed thereat, the first hinge attachment means for attaching the hinge member to the one or more frame attachment means; and one or more earpiece members, each having an earpiece attachment means formed at a first extremity thereof for attaching the one or more earpiece members to the second hinge attachment means, and each having an ear holder element formed at a second extremity thereof.

According to a third embodiment of the present invention, the one or more lens frames have an optical lens formed or fitted therein.

According to a fourth embodiment of the present invention, the one or more optical lenses are a Fresnel-type lenses.

According to a fifth embodiment of the present invention, the flat pack optical device kit is formed in a planar arrangement.

According to a variation of the fifth embodiment of the present invention, the planar arrangement includes the one or more lens frames, the one or more support arms and the supporting apparatus formed as a frangibly attached arrangement for selectable disassembly from the planar arrangement, and for cooperative assembly so as to form the optical device.

According to another variation of the fifth embodiment of the present invention, the planar arrangement is formed as a substantially credit card sized arrangement.

Furthermore, there is provided a method of construction of an optical device from a flat pack optical device kit, which includes the steps of: separating each of the components from the flat pack optical device kit; attaching each lens frame to a nosepiece bridge; attaching a hinge member to each lens frame; flexing a hinge element of each hinge member; and attaching an earpiece member to each hinge member.

BRIEF DESCRIPTION OF THE DRAWINGS

The present invention will be more fully understood and its features and advantages will become apparent to those skilled in the art by reference to the ensuing description, taken in conjunction with the accompanying drawings, in which.

DETAILED DESCRIPTION OF THE INVENTION

Despite the availability of a multiplicity of compact, folded and assemblable glasses, most of these are generally not much smaller than regular glasses except for being conveniently shaped, folded or contained in a convenient carrying container. In accordance with a preferred embodiment of the present invention, a flat pack kit is disclosed which generally has the size of a conventional credit card, from which a pair of glasses is assemblable in an emergency situation, without the need for any special skills, equipment or adhesives.

The lenses that may be utilized for such a kit include purpose made prescription lenses for general use, reading lenses, sun-protection lenses, safety lenses or any combination of these, such as tinted bifocal or multi-focal lenses, to mention a few examples.

Figure 1:
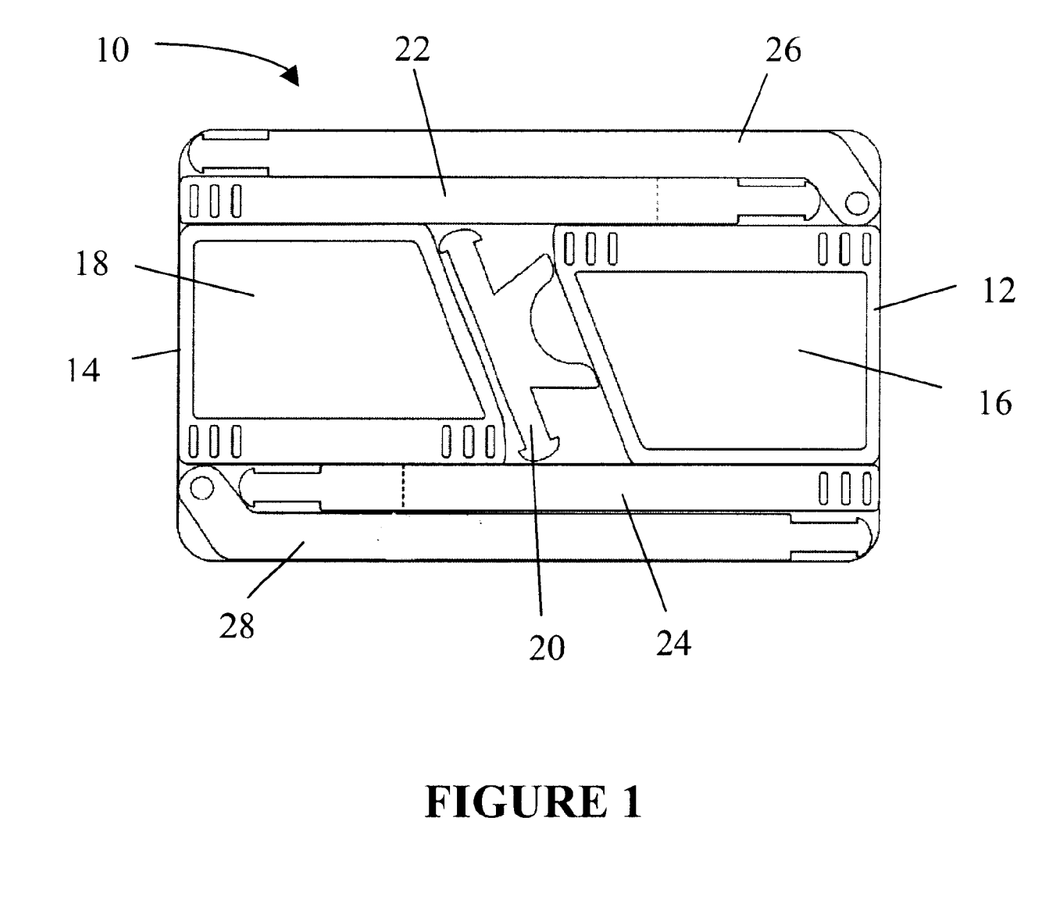
FIG. 1 illustrates a flat pack optical device kit constructed in accordance with a preferred embodiment of the present invention.

With reference to FIG. 1, there is seen, according to a preferred embodiment of the present invention, a flat pack optical device kit, generally referenced 10. Kit 10 includes two lens frames referenced 12 and 14, having disposed therein optical lenses referenced 16 and 18, respectively, a nosepiece bridge referenced 20, two hinge members referenced 22 and 24 and two earpiece members referenced 26 and 28.

Kit 10 may be formed and packaged in a number of configurations. As will be appreciated by persons skilled in the art, alternative configurations may include but are not limited, in accordance with embodiments of the present invention, to components adhering to a backing card, in blister-packing, in sleeve-packing, arranged in a semi-rigid envelope or arranged as a frangible assembly.

With regard to assembling the components of the kit, it should be noted that, with the exception of lens frames 12 and 14 and lenses 16 and 18 disposed respectively therein, each component is usable on either the left or right side relative to the user. Although frames 12 and 14 as seen in FIG. 1, appear generally similar, frame 12 and lens 16 are specifically prescribed for the right eye, for example; whereas frame 14 and lens 18, requires inversion, and is indicated (not shown) as prescribed for the left eye. In accordance with embodiments of the present invention, lenses 16 and 18 may be formed in or fitted into frames 12 and 1, respectively. In order to maintain as flat a surface for kit 10 as possible, as will be appreciated by persons skilled in the art, lenses 16 and 18 are formed as Fresnel-type lenses, from high refractive optic material or from other suitable lens material. Alternatively, lenses 16 and 18 may be formed of planar glare resistant optically transparent material.

Figure 2:
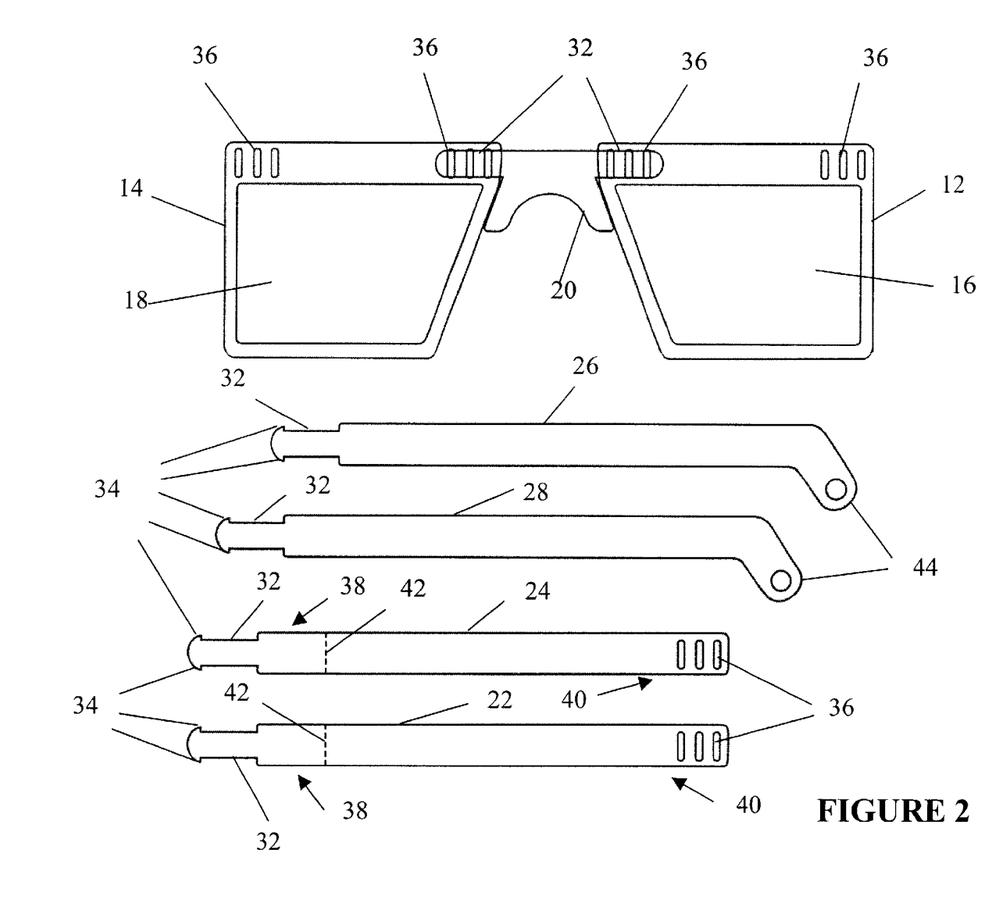
FIG. 2 is a diagrammatic view of the components illustrated in FIG. 1.

Referring now to FIG. 2, in accordance with embodiments of the present invention, kit 10 (as shown in FIG. 1) is seen separated into individual components, namely, right and left lens frames 12 and 14 including lenses 16 and 18 disposed respectively therein, nosepiece bridge 20, two hinge members 22 and 24 and two earpiece members 26 and 28. In a frangible assembly, kit 10 components are separated by carefully fracturing each component from the assembly.

Each component is formed having assembly devices for enabling the assembly of the glasses from kit 10. Nosepiece bridge 20 is formed having assembly lugs referenced 32 on both sides. Each lug 32 includes one or more locking elements referenced 34. Lugs referred to hereinbelow are formed having one or more similar locking elements. Lens frames 12 and 14 have lug receptors referenced 36 disposed on the innter and outer edges thereof. Hinge members 22 and 24 each have an assembly lug referenced 32 disposed at a distal end referenced 38 thereof and a lug recweptor referenced 36 formed at a proximal end referenced 40 thereof, with a hingeable element referenced 42 formed therebetween, disposed close to assembly lug 32 thereof. Earpiece members 26 and 28 each have an assembly lug referenced 32 formed at a distal end (not referenced) thereof, and an ear-holder referenced 44 disposed at a proximal end thereof.

Figure 3:
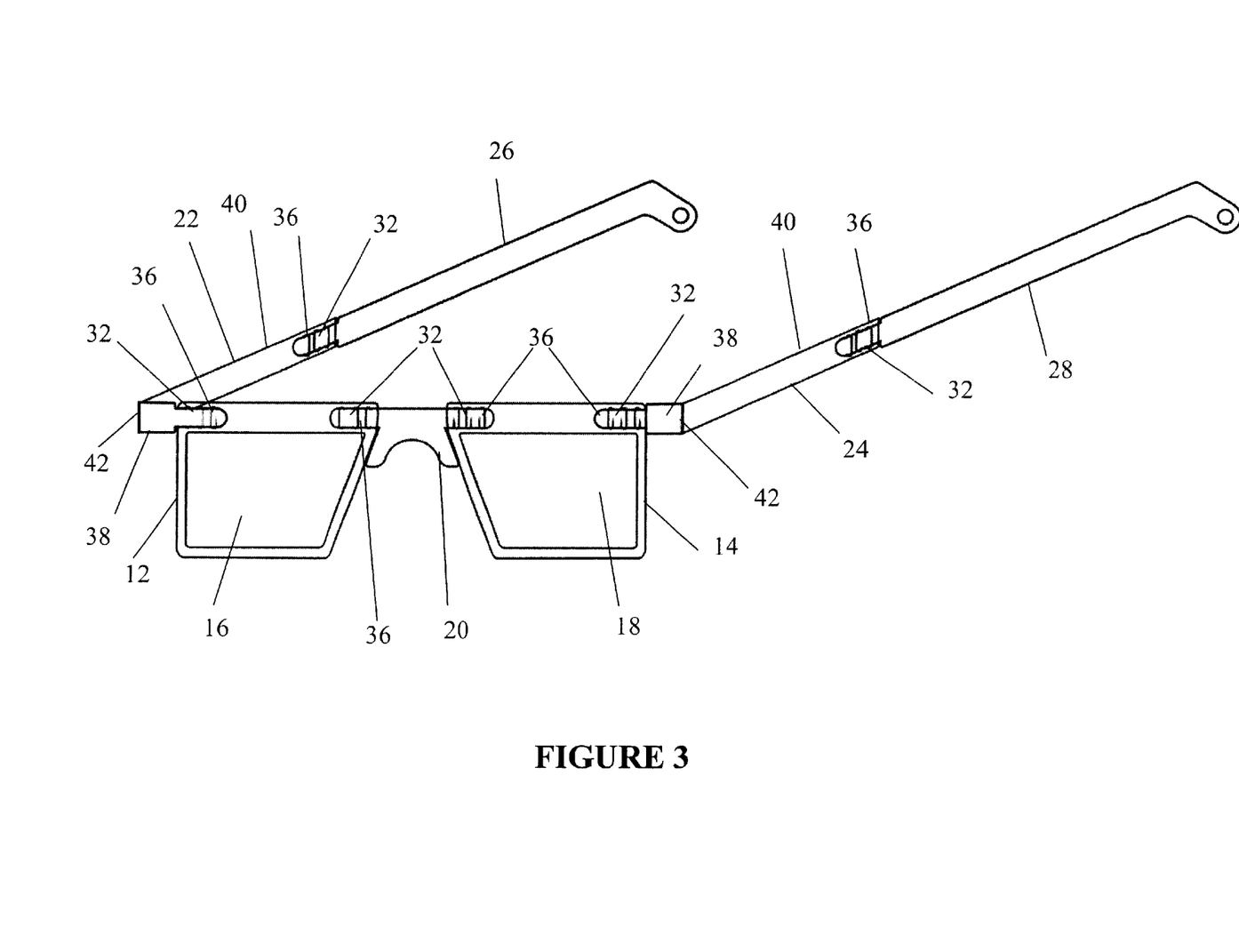
FIG. 3 is a perspective view of a pair of glasses assembled from the flat pack optical device kit shown in FIG. 1.

Referring now to FIG. 3, in accordance with embodiments of the present invention, components of kit 10 are assembled according to the following steps:

Right lens frame 12 and inverted left lens frame 14 are attached to nosepiece bridge 20 by inserting assembly lugs 32 into inner edge lug receptors 36. Hinge members 22 and 24 are attached to lens frames 12 and 14 by inserting assembly lugs 32 into outer edge lug receptors 36. Relative to distal portions 38 (FIG. 2) of hinge members 22 and 24, proximal portions 40 (FIG. 2) are flexed thereby to cause hingable elements 42 to bend such that distal and proximal portions 38 and 40, respectively, are approximately at right angles. Earpiece members 26 and 28 are attached to hinge members 22 and 24 by inserting assembly lugs 32 of earpiece members 26 and 28 into lug receptors 36 of hinge members 22 and 24.

Figure 4:
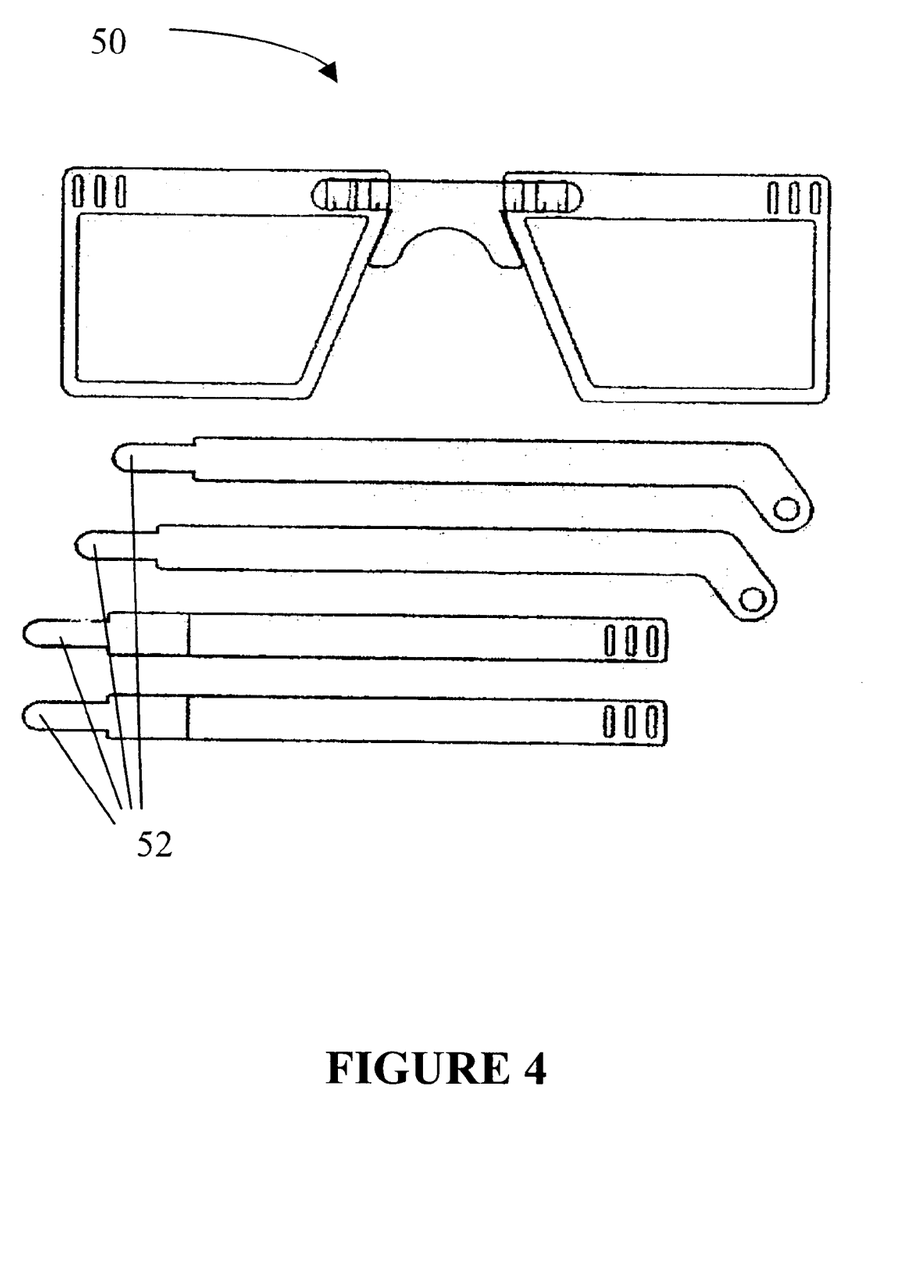
FIG. 4 illustrates a flat pack optical device kit constructed in accordance with an alternative embodiment of the present invention.

Referring now to FIG. 4, there is seen a non-locking kit generally referenced 50, generally similar to that shown and described above in conjunction with FIGS. 1–3, but wherein the lugs, referenced 52, are formed without locking elements 34 (as seen in FIGS. 1–3). Omitting locking elements 34, while partially reducing the rigidity of the assembled glasses, enables these to be disassembled for later use.

Figure 5:
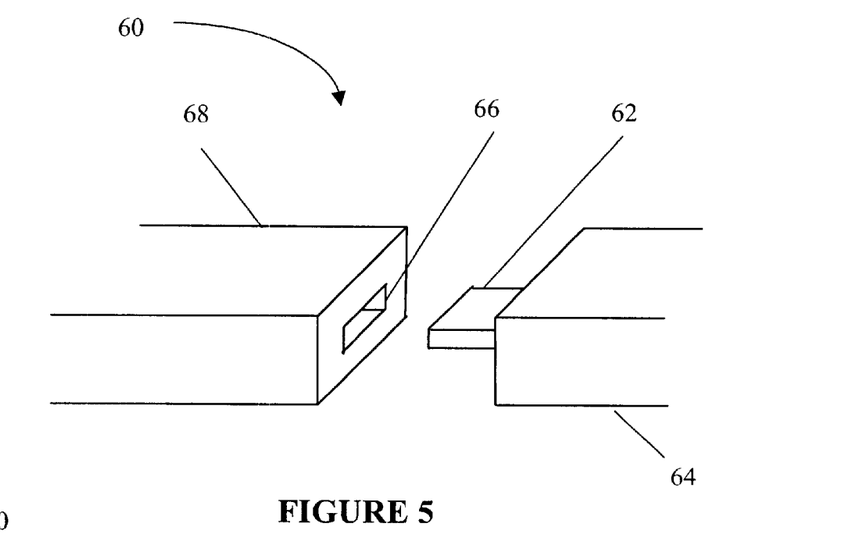
FIG. 5 is a perspective view of a stud and socket joint for assembling components of a flat pack optical device kit, in accordance with an alternative embodiment of the present invention.
Figure 6:
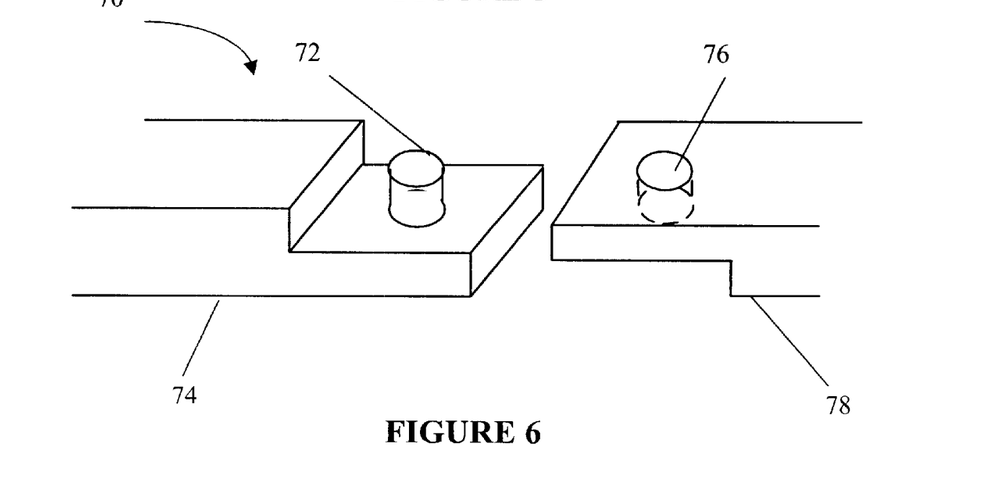
FIG. 6 is a perspective view of a mortise and tenon joint for assembling components of a flat pack optical device kit, in accordance with another embodiment of the present invention.

It will be appreciated by persons skilled in the art that assembly of the various components is illustrated but not limited to using assembly lugs 32 and lug receptors 36 as a means for assembling components. Alternative assembly or fastening devices are well known to persons skilled in the art. Examples of some such alternative fastening devices are illustrated in FIGS. 5 and 6. In FIG. 5, there is seen a mortise-and-tenon-type joint generally referenced 60, whereby joining two components is achieved by inserting a tenon referenced 62 formed on an extremity of component 64 into a mortise referenced 66 formed in an extremity of component 68. In FIG. 6, there is seen a stud-and-socket connector generally referenced 70 which includes one or more studs referenced 72 formed on an extremity of component 74 and having one or more corresponding sockets referenced 76 formed in component 78.

Figure 7:
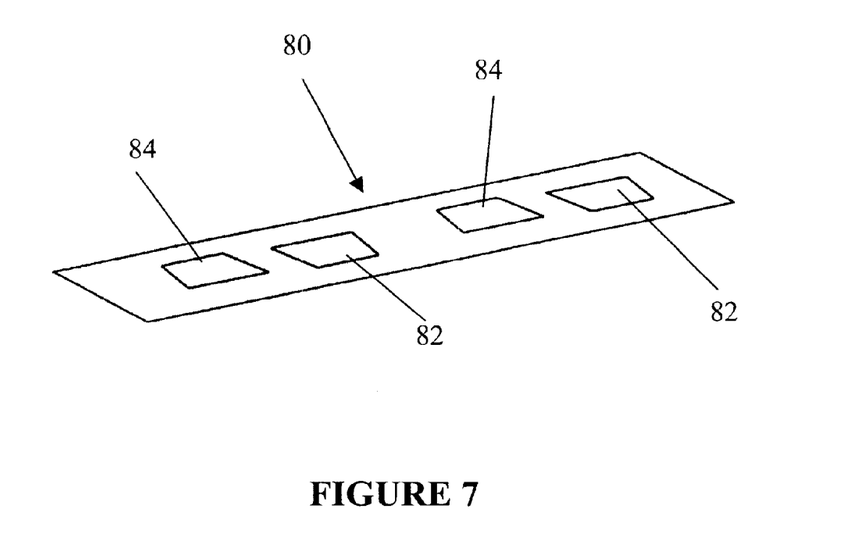
FIG. 7 is a perspective view of a continuous strip of plastic material having lens apertures die-cut therefrom.
Figure 8:
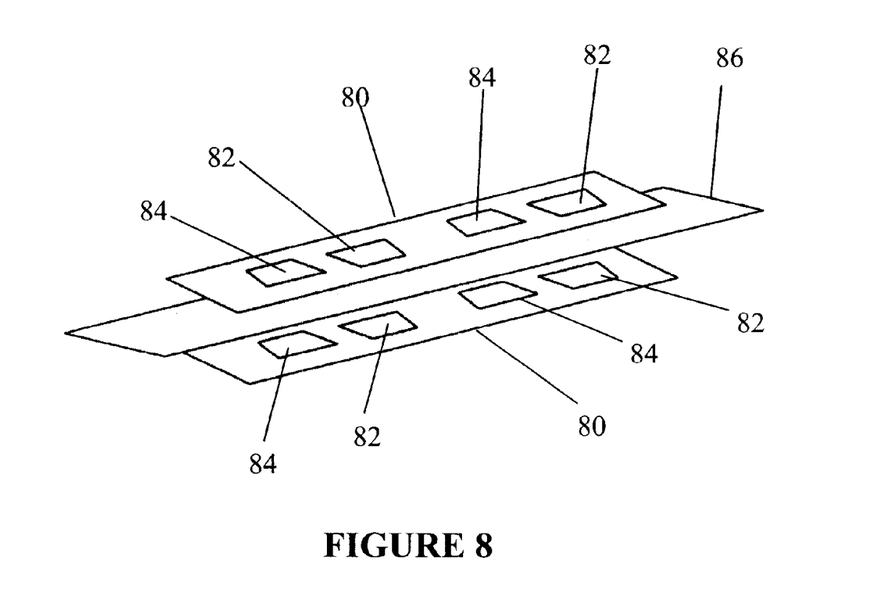
FIG. 8 is a perspective view of two pre-assembled layers of continuous strips of plastic material having die-cut lens apertures with a continuous lens strip therebetween, for bonding together.

Referring now to FIGS. 7–8, there is illustrated a process for manufacturing, for example a flat-pack sunglasses or safety glasses kit, or others specifically wherein the lenses are formed as a flat continuous sheet, in accordance with an embodiment of the present invention. A continuous strip generally referenced 80 of plastic material having a preselected length, width and thickness as seen in FIG. 7, is passed through a die-cutter, which cuts out a pair of lens apertures referenced 82 and 84. Die-cut strips 80 are stored as rolls until a sufficient quantity has been prepared. As seen in FIG. 8, two strips of die-cut strips 80 are fed, having accurate registration of lens apertures 82 and 84, together with an interposed continuous lens strip referenced 86 of suitable optical plastic material therebetween, through a sonic welder or other suitable bonding process. This produces a bonded sandwich (not shown) of two outer layers 80 and a lens layer 86. Thereafter, the sandwich strip is passed through one or more die-cutters to produce substantially credit card-sized frangible flat pack glasses kits 10 substantially as seen in FIG. 1 and as described hereinabove.

In accordance with alternative embodiments of the present invention, a similar process to that described hereinabove may be utilized to produce flat-pack kits with optical prescription lenses, which are fitted into the lens frame apertures. In order to maintain the flat pack feature, fitted lenses are made as Fresnel lenses or from high refractive optical material. Alternative lens configurations include multi-focal, bifocal, myopia, hyperopia, astigmatism and reading lenses.

It will be appreciated by persons skilled in the art that the present invention is not limited by the drawings and description hereinabove presented. Rather, the invention is defined solely by the claims that follow.

What is claimed is:

1. A flat pack optical device kit, which includes:
   (a) at least one lens frame, each having a lens disposed therein and each having at least one frame attachment means formed on said frame;
   (b) at least one support arm, each having, formed at a first extremity thereof, arm attachment means for attaching said at least one support arm to said at least one lens frame and each having an ear holder element formed at a second extremity thereof; and
   (c) apparatus for supporting said at least one lens frame, and said at least one support arm in a planar arrangement, wherein said at least one lens frame and said at least one support arm are adapted for selectable disassembly and complete separation from said apparatus and for subsequent cooperative assembly so as to form said optical device.

2. A flat pack optical device kit according to claim 1, which also includes a nosepiece bridge having at least one bridge attachment means for joining said at least one lens frame thereto.

3. A flat pack optical device kit according to claim 1, wherein said at least one support arm includes:

a) at least one hinge member, each having a first and second extremity and a hinge element formed in a predetermined position therebetween, said first and second extremities having, respectively, a first and second hinge attachment means formed thereat, said first hinge attachment means for attaching said hinge member to said at least one frame attachment means; and
   b) at least one earpiece member, each having an earpiece attachment means formed at a first extremity thereof for attaching said at least one earpiece member to said second hinge attachment means, and each having an ear holder element formed at a second extremity thereof.

4. A flat pack optical device kit according to claim 1, wherein said at least one lens frame has a lens formed therein.

5. A flat pack optical device kit according to claim 1, wherein said at least one lens frame has a lens fitted therein.

6. A flat pack optical device kit according to claim 1, wherein said at least one lens is a Fresnel-type lens.

7. A flat pack optical device kit according to claim 1, wherein said flat pack optical device kit is formed in a planar arrangement.

8. A flat pack optical device kit according to claim 7, wherein said planar arrangement includes said at least one lens frame, said at least one support arm and said supporting apparatus formed as a frangibly attached arrangement for selectable disassembly from said planar arrangement, and for cooperative assembly so as to form said optical device.

9. A flat pack optical device kit according to claim 8, wherein said planar arrangement is formed as a substantially credit card sized arrangement.

10. A method of construction of an optical device from a flat pack optical device kit, including the steps of:
    a) separating each component from a flat pack optical device kit;
    b) first attaching each lens frame to a nosepiece bridge;
    c) second attaching a hinge member to each lens frame;
    d) flexing a hinge element of each hinge member; and
    e) third attaching an earpiece member to each hinge member.

11. A flat pack optical device kit, comprising:
    (a) at least one lens frame, each having a lens disposed therein and each having at least one frame attachment means formed on said frame;
    (b) at least one support arm, each having, formed at a first extremity thereof, arm attachment means for attaching said at least one support arm to said at least one lens frame and each having an ear holder element formed at a second extremity thereof; and
    (c) apparatus for supporting said at least one lens frame and said at least one support arm formed as a frangibly attached planar arrangement, wherein said at least one lens frame and said at least one support arm are adapted for selectable disassembly and complete separation from said apparatus, and for subsequent cooperative assembly so as to form said optical device.

12. A flat pack optical device kit comprising:
    (a) two lens frames, having a lens disposed therein and each having two frame attachment means formed on said frames;
    (b) two support arms, each having, formed at a first extremity thereof, arm attachment means for attaching one of said support arms to one of said lens frames and each of said support arms having an ear holder element formed at a second extremity thereof;

(c) a nosepiece bridge having two bridge attachment means for joining said two lens frames thereto; and (d) apparatus for supporting said two lens frames said two support arms and said nosepiece bridge formed as a frangibly attached planar arrangement, wherein said two lens frames, said two support arms, and said nosepiece bridge are adapted for selectable disassembly and complete separation from said apparatus planar arrangement, and for subsequent cooperative assembly so as to form said optical device.

* * * * *